(12) United States Patent
Murphy et al.

(10) Patent No.: US 8,555,776 B2
(45) Date of Patent: Oct. 15, 2013

(54) SELECTION INDICATOR RIBBON FOR AN OVEN USER INTERFACE

(75) Inventors: Joshua B. Murphy, Columbus, OH (US); Jeffrey T. Debord, Worthington, OH (US)

(73) Assignee: Illinois Tool Works Inc., Glenview, IL (US)

( * ) Notice: Subject to any disclaimer, the term of this patent is extended or adjusted under 35 U.S.C. 154(b) by 176 days.

(21) Appl. No.: 13/274,657

(22) Filed: Oct. 17, 2011

(65) Prior Publication Data

US 2013/0092033 A1 Apr. 18, 2013

(51) Int. Cl.
*A47J 43/28* (2006.01)

(52) U.S. Cl.
USPC .......................................................... 99/342

(58) Field of Classification Search
USPC ....... 99/325, 326, 327, 328, 329 R, 331, 332, 99/333, 468; 219/158, 412, 413, 414, 415, 219/396, 397, 398, 399, 506, 509, 510, 679, 219/700, 702, 705, 708, 709, 748, 750, 219/762; 715/704, 772, 837
See application file for complete search history.

(56) References Cited

U.S. PATENT DOCUMENTS

| | | | |
|---|---|---|---|
| 6,750,433 B2 | 6/2004 | Guenther et al. | |
| 6,936,801 B1 * | 8/2005 | Head | 219/702 |
| 7,141,258 B2 * | 11/2006 | Hillmann | 426/233 |
| 7,378,620 B2 * | 5/2008 | Lubrina | 219/505 |
| 7,461,588 B2 | 12/2008 | Head | |
| 2008/0290087 A1 | 11/2008 | Ben-Shmuel et al. | |
| 2009/0045191 A1 | 2/2009 | Ben-Shmuel et al. | |

(Continued)

FOREIGN PATENT DOCUMENTS

| | | |
|---|---|---|
| DE | 102008032453 A1 | 1/2010 |
| DE | 102009011678 A1 | 8/2010 |

(Continued)

OTHER PUBLICATIONS

International Search Report and Written Opinion of corresponding PCT/US2012/059938 mailed Jan. 7, 2013.

*Primary Examiner* — Geoffrey S Evans
*Assistant Examiner* — Brandon Harvey
(74) *Attorney, Agent, or Firm* — Nelson Mullins Riley & Scarborough LLP

(57) ABSTRACT

An oven may include a cooking chamber, a user interface, and a cooking controller. The cooking chamber may be configured to receive a food product. The user interface may be configured to display information associated with processes employed for cooking the food product. The cooking controller may be operably coupled to the user interface to direct presentation of cooking parameter entry pages to enable an operator to define cooking parameters for cooking the food product in the cooking chamber. The cooking controller may include processing circuitry configured to enable an operator to make cooking parameter entries in a series of entry pages rendered at the user interface. Each of the entry pages presented may include a selection indicator ribbon displaying graphical elements corresponding to each cooking parameter entered via previous entry pages.

20 Claims, 21 Drawing Sheets

(56) References Cited

U.S. PATENT DOCUMENTS

| | | |
|---|---|---|
| 2009/0057302 A1 | 3/2009 | Ben-Shmuel et al. |
| 2009/0236333 A1 | 9/2009 | Ben-Shmuel et al. |
| 2009/0236334 A1 | 9/2009 | Ben-Shmuel et al. |
| 2009/0236335 A1 | 9/2009 | Ben-Shmuel et al. |
| 2010/0006564 A1 | 1/2010 | Ben-Shmuel et al. |
| 2010/0006565 A1 | 1/2010 | Ben-Shmuel et al. |
| 2011/0017728 A1 | 1/2011 | Ben-Shmuel et al. |
| 2011/0031236 A1 | 2/2011 | Ben-Shmuel et al. |
| 2011/0031240 A1 | 2/2011 | Ben-Shmuel et al. |
| 2011/0033584 A1 | 2/2011 | Bilchinsky et al. |

FOREIGN PATENT DOCUMENTS

| | | |
|---|---|---|
| EP | 1384951 A1 | 1/2004 |
| EP | 2211115 A2 | 7/2010 |
| EP | 2336642 A2 | 6/2011 |
| WO | 2005067639 | 7/2005 |
| WO | 2011036030 A1 | 3/2011 |

* cited by examiner

SELECTION INDICATOR RIBBON FOR AN OVEN USER INTERFACE

TECHNICAL FIELD

Example embodiments generally relate to ovens and, more particularly, relate to a user interface element that graphically displays a series of menu option selections made by a user.

BACKGROUND

Combination ovens that are capable of cooking using more than one heating source (e.g., convection, steam, microwave, etc.) have been in use for decades. Each cooking source comes with its own distinct set of characteristics. Thus, a combination oven can typically leverage the advantages of each different cooking source to attempt to provide a cooking process that is improved in terms of time and/or quality. For example, microwave cooking may be faster than convection or other types of cooking and may therefore be employed to speed up the cooking process. However, a microwave typically cannot be used to cook some foods and cannot brown most foods. Given that browning may add certain desirable characteristics in relation to taste and appearance, another cooking method may be employed in addition to microwave cooking in order to achieve browning.

The ability to use multiple heating sources may add to the complexity of cooking with some combination ovens. The number of options for employing cooking processes, and the number of unique combinations of cooking sequences for optimizing results over different food products may be quite large. Thus, being able to automate some or all of the cooking processes and still achieve good results can be a very attractive goal. However, it is also desirable to allow users with different skill levels and different interests in controlling the details of the cooking process to have wide latitude to use the oven in a manner that is most satisfying for their respective individual tastes.

BRIEF SUMMARY OF SOME EXAMPLES

Some example embodiments may provide an oven that employs multiple cooking sources that are electronically controlled via processing circuitry. The processing circuitry may be configured to provide a selection indication ribbon to be displayed at a user interface of the oven in order to allow the user to continuously view past entries at least until entry of all cooking parameters have been entered. The user may, in some cases, then be able to go back to any particular entry step by selecting a graphical element or icon that corresponds to the corresponding entry.

In one example embodiment, an oven is provided. The oven may include a cooking chamber, a user interface, and a cooking controller. The cooking chamber may be configured to receive a food product. The user interface may be configured to display information associated with processes employed for cooking the food product. The cooking controller may be operably coupled to the user interface to direct presentation of cooking parameter entry pages to enable an operator to define cooking parameters for cooking the food product in the cooking chamber. The cooking controller may include processing circuitry configured to enable an operator to make cooking parameter entries in a series of entry pages rendered at the user interface. Each of the entry pages presented may include a selection indicator ribbon displaying graphical elements corresponding to each cooking parameter entered via previous entry pages.

In another example embodiment, a cooking controller for use in an oven including a cooking chamber and a user interface is provided. The user interface may be configured to display information associated with processes employed for cooking the food product in the cooking chamber. The cooking controller may be operably coupled to the user interface to direct presentation of cooking parameter entry pages to enable an operator to define cooking parameters for cooking the food product. The cooking controller may include processing circuitry configured to enable an operator to make cooking parameter entries in a series of entry pages rendered at the user interface. Each of the entry pages presented may be generated by the processing circuitry to include a selection indicator ribbon displaying graphical elements corresponding to each cooking parameter entered via previous entry pages.

Some example embodiments may improve the cooking performance and/or improve the operator experience when cooking with an oven employing an example embodiment.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
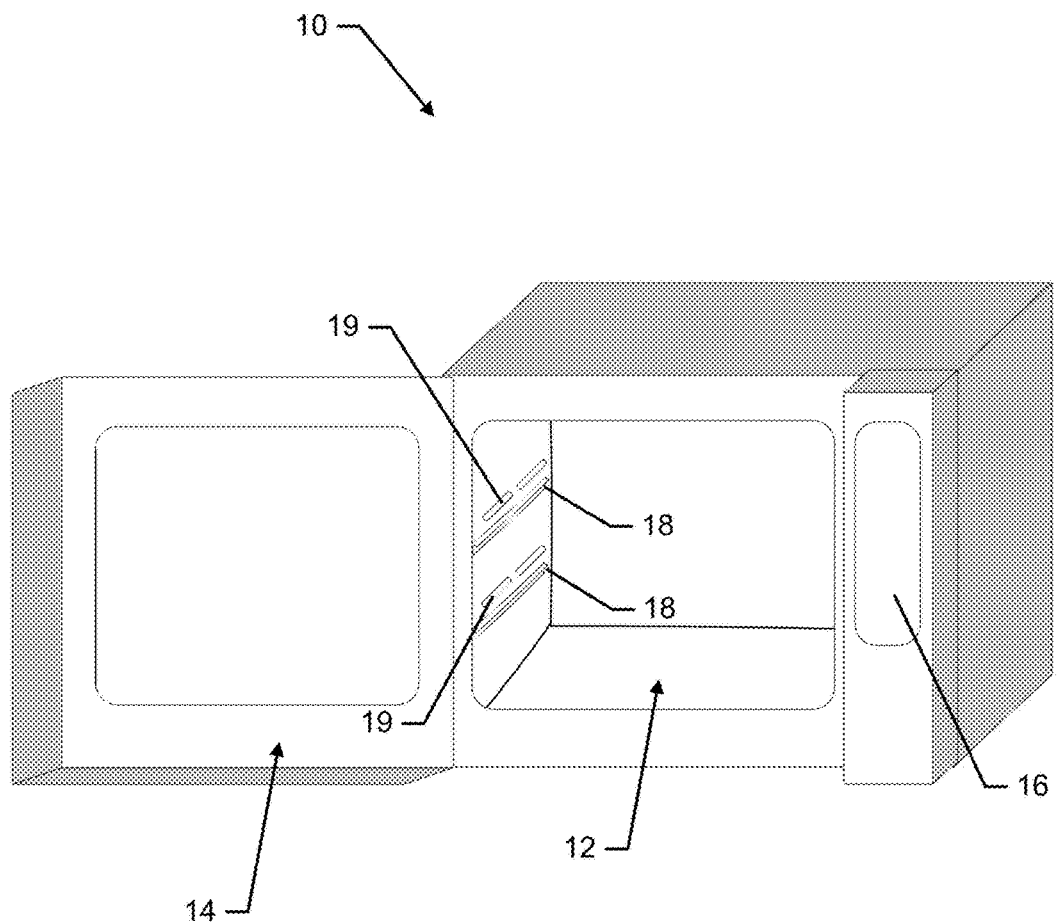
FIG. 1 illustrates a perspective view of an oven capable of employing at least two energy sources according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments may improve the cooking performance of an oven and/or may improve the operator experience of individuals employing an example embodiment. In this regard, since processing circuitry that controls the application of various heating sources can be used to provide operators with an intuitive interface to select cooking parameters, and those cooking parameters are displayed throughout the selection process in a selection ribbon of an example embodiment, it may be easier for users to control entry of initial conditions and ensure that the proper initial conditions or other cooking parameters have been entered. In this regard, some example embodiments may provide an oven that employs multiple cooking sources that are electronically controlled via processing circuitry. The processing circuitry may enable users with various different skill levels to utilize different levels of control and automation based on the mode of operation of the oven. The different levels of automation may be at least partially supported by the entry of initial conditions or other cooking parameters by the operator. In this regard, the cooking parameters entered may support various calculations or determinations by the processing circuitry to optimize and/or automate various cooking processes. Some example embodiments may provide a selection indication ribbon to be displayed at a user interface of the oven in order to allow the user to continuously view past entries at least until entry of all cooking parameters have been entered. The user may, in some cases, then be able to go back to any particular entry step by selecting a graphical element or icon that corresponds to the respective particular entry.

FIG. 1 illustrates a perspective view of an oven 10 according to an example embodiment. The oven 10 of FIG. 1 is shown as an oven that employs two energy sources. However, it should be appreciated that example embodiments of the user interface described in connection with oven 10 may also be practiced in connection with a number of other ovens that may have only a single energy source or even more than two energy sources. Thus, the number of energy sources employed by the oven 10 should not be construed as limiting example embodiments. As shown in FIG. 1, the oven 10 may include a cooking chamber 12 into which a food product may be placed for the application of heat by any of at least two energy sources that may be employed by the oven 10. The cooking chamber 12 may include a door 14 and an interface panel 16, which may sit proximate to the door 14 when the door 14 is closed. In an example embodiment, the interface panel 16 may include a touch screen display capable of providing visual indications to an operator and further capable of receiving touch inputs from the operator. The interface panel 16 may be the mechanism by which instructions are provided to the operator, and the mechanism by which feedback is provided to the operator regarding cooking process status, options and/or the like.

In some embodiments, the oven 10 may include multiple racks or may include rack (or pan) supports 18 or guide slots in order to facilitate the insertion of one or more racks or pans holding food product that is to be cooked. In an example embodiment, airflow slots 19 may be positioned proximate to the rack supports 18 (e.g., above the rack supports in one embodiment) to enable air to be forced over a surface of food product placed in a pan or rack associated with the corresponding rack supports 18. Food product placed on any one of the racks (or simply on a base of the cooking chamber 12 in embodiments where multiple racks are not employed) may be heated at least partially using radio frequency (RF) energy. Meanwhile, the airflow that may be provided may be heated to enable browning to be accomplished as described in greater detail below.

Figure 2:
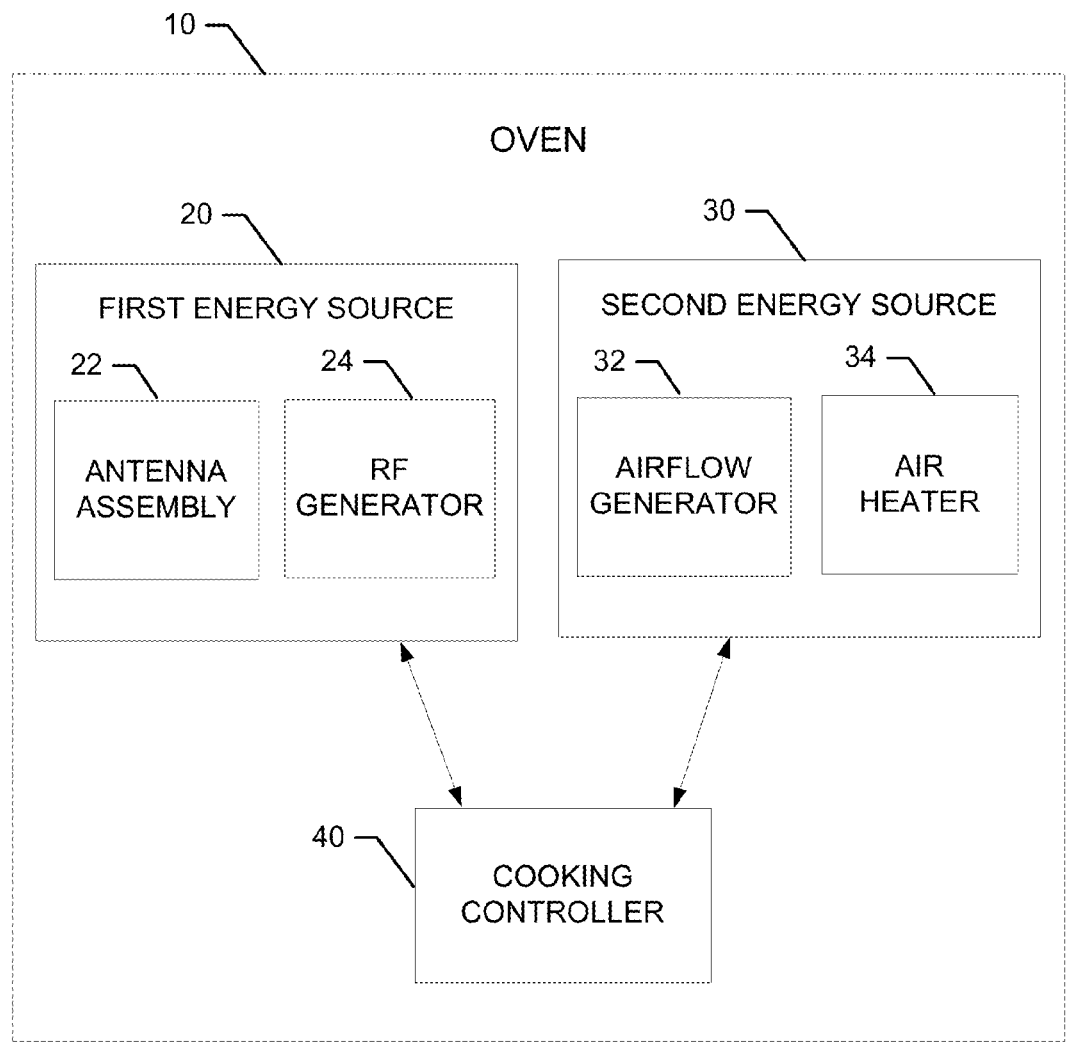
FIG. 2 illustrates a functional block diagram of the oven of FIG. 1 according to an example embodiment.

FIG. 2 illustrates a functional block diagram of the oven 10 according to an example embodiment. As shown in FIG. 2, the oven 10 may include at least a first energy source 20 and a second energy source 30. The first and second energy sources 20 and 30 may each correspond to respective different cooking methods. However, it should be appreciated that additional energy sources may also be provided in some embodiments.

In an example embodiment, the first energy source 20 may be a radio frequency (RF) energy source configured to generate relatively broad spectrum RF energy to cook food product placed in the cooking chamber 12 of the oven 10. Thus, for example, the first energy source 20 may include an antenna assembly 22 and an RF generator 24. The RF generator 24 of one example embodiment may be configured to generate RF energy at selected levels over a range of 800 MHz to 1 GHz. The antenna assembly 22 may be configured to transmit the RF energy into the cooking chamber 12 and receive feedback to indicate absorption levels of respective different frequencies in the food product. The absorption levels may then be used to control the generation of RF energy to provide balanced cooking of the food product.

In some example embodiments, the second energy source 30 may be a energy source capable of inducing browning of the food product. Thus, for example, the second energy source 30 may include an airflow generator 32 and an air heater 34. The airflow generator 32 may include a fan or other device capable of driving airflow through the cooking chamber 12 and over a surface of the food product (e.g., via the airflow slots). The air heater 34 may be an electrical heating element or other type of heater that heats air to be driven over the surface of the food product by the airflow generator 32. Both the temperature of the air and the speed of airflow will impact browning times that are achieved using the second energy source 30.

In an example embodiment, the first and second energy sources 20 and 30 may be controlled, either directly or indirectly, by a cooking controller 40. The cooking controller 40 may be configured to receive inputs descriptive of the food product and/or cooking conditions in order to provide instructions or controls to the first and second energy sources 20 and 30 to control the cooking process. In some embodiments, the cooking controller 40 may be configured to receive both static and dynamic inputs regarding the food product and/or cooking conditions. Dynamic inputs may include feedback data regarding absorption of RF spectrum, as described above. In some cases, dynamic inputs may include adjustments made by the operator during the cooking process. The static inputs may include cooking parameters that are input by the operator, for example, as initial conditions or cooking instructions. In some examples, the static inputs may include a description of the food category or type, initial state or temperature, final desired state or temperature, a number and/or size of portions to be cooked, a location of the item to be cooked (e.g., when multiple trays or levels are employed), and/or the like.

In some embodiments, the cooking controller 40 may be configured to access data tables that define RF cooking parameters, and in some cases cooking parameters associated with other energy sources as well, that may be used to drive cooking components such as, for example, the RF generator 34 for the generation of RF energy at corresponding levels and/or frequencies for corresponding times determined by the data tables based on the cooking parameters entered by the user. As indicated above, the cooking parameters may include information descriptive of the food product. As such, the cooking controller 40 may be configured to employ a primary energy source and, in some cases, also employ other energy sources (e.g., secondary and tertiary or other energy sources) for cooking the food product.

In some cases, programs or recipes may be provided to define the cooking parameters to be employed for each of multiple potential cooking stages that may be defined for the food product and the cooking controller 40 may be configured to access and/or execute the programs or recipes. The programs or recipes may be stored based on initial conditions and respective desired final states for various different food products. However, in some cases, the programs or recipes may be named or identified by a numerical or coded listing that may facilitate storage and access in an organized fashion. In some embodiments, the cooking controller 40 may be configured to determine which program to execute based on inputs provided by the user. In this regard, for example, the user may utilize the interface panel 16 to input cooking parameters that the cooking controller 40 may use to identify a program to execute for cooking the food product. As an alternative, the user may utilize the interface panel 16 to input cooking parameters that the cooking controller 40 may use to identify a set of interfaces to be provided to the user so that the user can define the specific steps or instructions to execute for cooking the food product. In some cases, a mode of operation of the oven may at least partially determine the specific interfaces and/or functions that are accessible to the user for entry of the cooking parameters.

In some example embodiments, the cooking parameters may include initial conditions such as food category or type, initial state or temperature, a number and/or size of portions to be cooked, a location of the item to be cooked, and/or the like. Other cooking parameters may define a final desired state or temperature of the food product and/or specific cooking parameter values corresponding to one or more selectable energy sources. The cooking parameters may be individually entered by the operator based on sequential navigation through a menu of control console screens or pages as described below. Moreover, in an example embodiment, the cooking controller 40 may be configured to track each entry using a selection indicator ribbon that is displayed at least until all of the cooking parameters are entered. The selection indicator ribbon may provide an indication of each selection made by providing an icon, tile or other graphical element (e.g., textual descriptor) indicative of a corresponding selection in a ribbon or tile receptacle that displays the icons, tiles or graphical elements selected in a sequential display. Thereafter, the corresponding program or recipe may be executed and the selection indicator ribbon maybe removed. However, in some cases, the selection indicator ribbon may continue to be presented to reflect selections made so that the user can retrieve and/or modify any particular selection.

Figure 3:
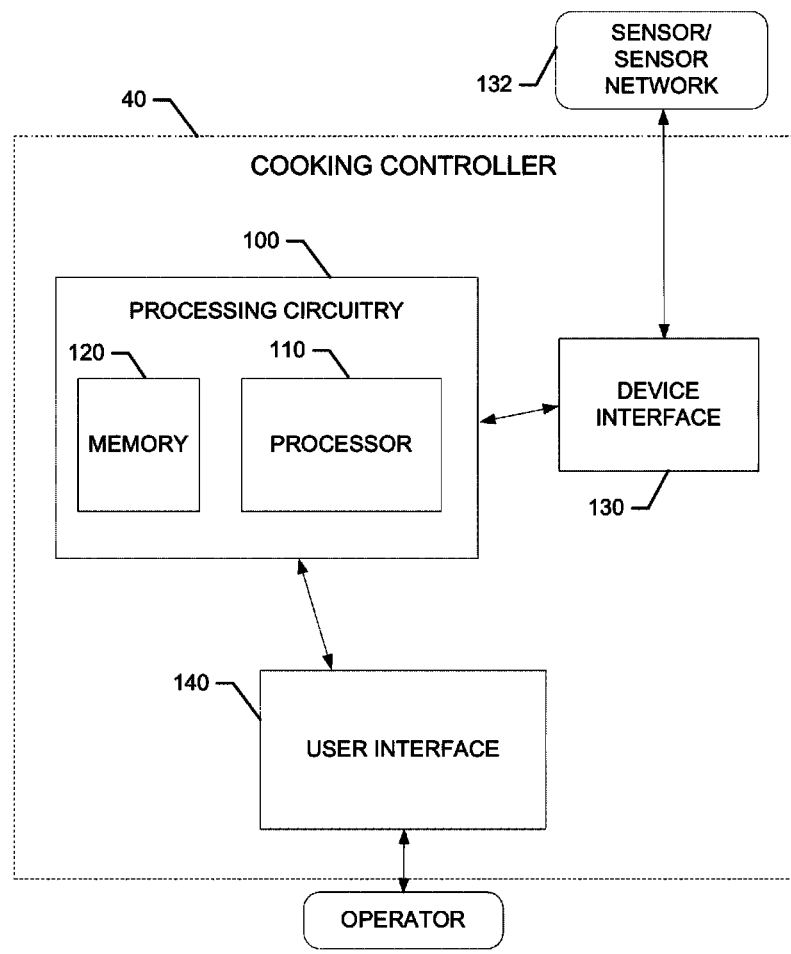
FIG. 3 illustrates a block diagram of a cooking controller according to an example embodiment.

FIG. 3 illustrates a block diagram of the cooking controller 40 according to an example embodiment. In some embodiments, the cooking controller 40 may include or otherwise be in communication with processing circuitry 100 that is configurable to perform actions in accordance with example embodiments described herein. As such, for example, the functions attributable to the cooking controller 40 may be carried out by the processing circuitry 100.

The processing circuitry 100 may be configured to perform data processing, control function execution and/or other processing and management services according to an example embodiment of the present invention. In some embodiments, the processing circuitry 100 may be embodied as a chip or chip set. In other words, the processing circuitry 100 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 100 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 100 may include a processor 110 and memory 120 that may be in communication with or otherwise control a device interface 130 and, a user interface 140. As such, the processing circuitry 100 may be embodied as a circuit chip (e.g., an integrated circuit chip) configured (e.g., with hardware, software or a combination of hardware and software) to perform operations described herein. However, in some embodiments, the processing circuitry 100 may be embodied as a portion of an on-board computer.

The user interface 140 (which may be embodied as, include, or be a portion of the interface panel 16) may be in communication with the processing circuitry 100 to receive an indication of a user input at the user interface 140 and/or to provide an audible, visual, mechanical or other output to the user (or operator). As such, the user interface 140 may include, for example, a display (e.g., a touch screen), one or more hard or soft buttons or keys, and/or other input/output mechanisms. In some embodiments, the user interface 140 may be provided on a front panel (e.g., positioned proximate to the door 14), on a portion of the oven 10.

The device interface 130 may include one or more interface mechanisms for enabling communication with other devices such as, for example, sensors of a sensor network (e.g., sensor/sensor network 132) of the oven 10, removable memory devices, wireless or wired network communication devices, and/or the like. In one example, the device interface 130 may receive input at least from a temperature sensor that measures the air temperature of air heated (e.g., by air heater 34) prior to introduction of such air (e.g., by the airflow generator 32) into the cooking chamber 12. In some cases, the device interface 130 may be any means such as a device or circuitry embodied in either hardware, or a combination of hardware and software that is configured to receive and/or transmit data from/to sensors that measure any of a plurality of device parameters such as frequency, temperature (e.g., in the cooking chamber 12 or in air passages associated with the second energy source 30), air speed, and/or the like. Alternatively or additionally, the device interface 130 may provide interface mechanisms for any devices capable of wired or wireless communication with the processing circuitry 100.

In an exemplary embodiment, the memory 120 may include one or more non-transitory memory devices such as, for example, volatile and/or non-volatile memory that may be either fixed or removable. The memory 120 may be configured to store information, data, applications, instructions or the like for enabling the cooking controller 40 to carry out various functions in accordance with exemplary embodiments of the present invention. For example, the memory 120 could be configured to buffer input data for processing by the processor 110. Additionally or alternatively, the memory 120 could be configured to store instructions for execution by the processor 110. As yet another alternative, the memory 120 may include one or more databases that may store a variety of data sets responsive to input from the sensor network, or responsive to programming of any of various cooking programs. Among the contents of the memory 120, applications may be stored for execution by the processor 110 in order to carry out the functionality associated with each respective application. In some cases, the applications may include control applications that utilize parametric data to control the application of heat by the first and second energy sources 20 and 30 as described herein. In this regard, for example, the applications may include operational guidelines defining expected cooking speeds for given initial parameters (e.g., food category/type, size, initial state, location, and/or the like) and desired final states using corresponding tables of RF generation guidelines, temperatures, times and air speeds. Thus, some applications that may be executable by the processor 110 and stored in memory 120 may include tables prescribing RF cooking parameters (e.g., levels and times) for given initial conditions and desired final states and/or desired air speed and temperature levels and times given initial conditions and desired final states.

The processor 110 may be embodied in a number of different ways. For example, the processor 110 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 110 may be configured to execute instructions stored in the memory 120 or otherwise accessible to the processor 110. As such, whether configured by hardware or by a combination of hardware and software, the processor 110 may represent an entity (e.g., physically embodied in circuitry—in the form of processing circuitry 100) capable of performing operations according to embodiments of the present invention while configured accordingly. Thus, for example, when the processor 110 is embodied as an ASIC, FPGA or the like, the processor 110 may be specifically configured hardware for conducting the operations described herein. Alternatively, as another example, when the processor 110 is embodied as an executor of software instructions, the instructions may specifically configure the processor 110 to perform the operations described herein.

In an example embodiment, the processor 110 (or the processing circuitry 100) may be embodied as, include or otherwise control the cooking controller 40. As such, in some embodiments, the processor 110 (or the processing circuitry 100) may be said to cause each of the operations described in connection with the cooking controller 40 by directing the cooking controller 40 to undertake the corresponding functionalities responsive to execution of instructions or algorithms configuring the processor 110 (or processing circuitry 100) accordingly. As an example, the cooking controller 40 may be configured to control RF levels, air speed, temperature and/or the time of application of heat based on initial conditions and/or other cooking parameters input at the user interface 140. In some examples, the cooking controller 40 may be configured to make adjustments to RF levels, time, temperature and/or air speed based on the initial conditions and/or desired final state that is entered if any one of the cooking parameters is adjusted.

Furthermore, in some example embodiments, the cooking controller 40 may be configured to determine a cooking impact that heat addition associated with one energy source (e.g., the second energy source) may provide to an already calculated cook time associated with another energy source (e.g., the first energy source 20). Thus, for example, if a cook time is determined for cooking relative to heating applied by the first energy source 20, and adjustments or inputs are made to direct usage of the second energy source 30, the cooking controller 40 may be configured to calculate adjustments (and apply such adjustments) to the cooking time of the first energy source 20 in order to ensure that the application of heat by another energy source does not overcook or overheat the food product.

In an example embodiment, the cooking controller 40 may also provide (e.g., via the user interface 140) the user with an intuitive interface for controlling cooking operations of the oven 10. FIGS. 4-20 illustrate various examples of control console or pop up screens of a user interface that may be employed by the cooking controller 40 according to an example embodiment. The options presented and the building of a selection indicator ribbon based on the selections made responsive to those options will now be described in accordance with an example embodiment referring to FIGS. 4-20.

Figure 4:
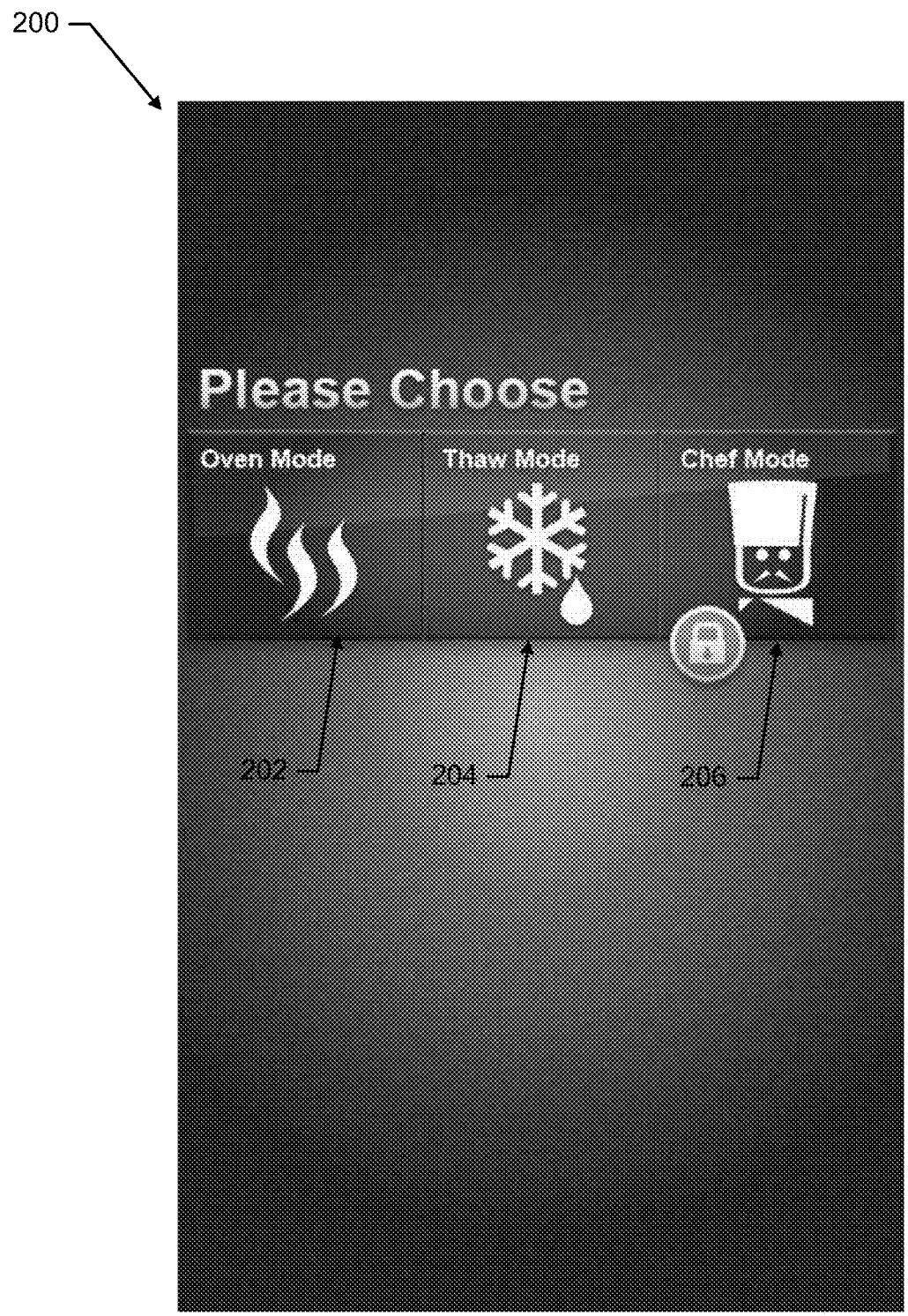
FIG. 4 illustrates a mode selection page presented on a user interface according to an example embodiment.
Figure 5:
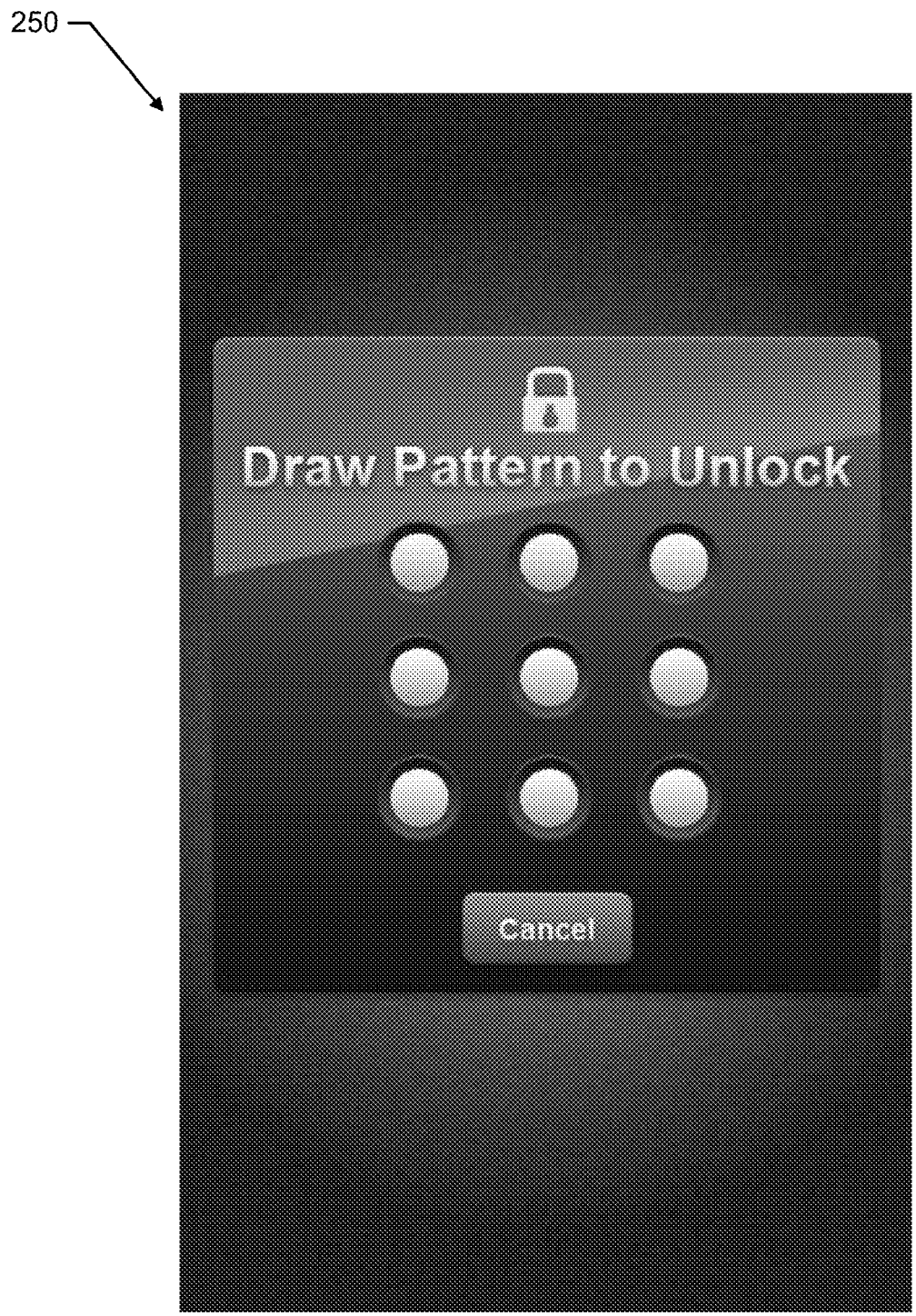
FIG. 5 illustrates an example of an unlock screen that may be presented in association with entering into the chef mode according to an example embodiment.

In this regard, as shown in FIG. 4, the user interface 140 may present (e.g., responsive to direction by the processing circuitry 100) a mode selection page 200. The mode selection page 200 may provide a series of icons, tiles or graphical elements that are each associated with a different cooking mode of the oven 10. For example, an oven mode icon 202 may correspond to a first mode of operation (e.g., an oven mode), while a thaw mode icon 204 may correspond to a second mode of operation (e.g., a thawing mode), and a chef mode icon 206 may correspond to a third mode of operation (e.g., a chef mode). Each of the cooking modes may have corresponding different operational flow paths associated therewith. In this regard, for example, the thawing mode may be limited to operational flows and corresponding selectable options that are applicable to thawing operations. Meanwhile, the oven mode may have operational flows and corresponding selectable options that are applicable to cooking operations with a high level of automation to simplify the cooking process for the operator. However, the chef mode may have operational flows that correspond to more selectable options that give the operator enhanced or more detailed options for controlling cooking options. In other words, the chef mode may enable the operator to provide detailed cooking instructions via enhanced option provision in the operational flows that are provided therein. In some embodiments, the chef mode may be password protected, or otherwise require the operator to login or pass an authentication in order to enter. FIG. 5 illustrates an example of an unlock screen 250 that may be presented in association with entering into the chef mode. In this regard, the user may be asked to define a pattern initially to register, and thereafter the user may be required to produce the pattern in order to authenticate and enter the chef mode.

Given that the chef mode may provide more options than other modes due to enhanced automation or limited functionality requirements in other modes, an example embodiment employed in the context of the chef mode will be described in reference to FIGS. 6-20, but it should be understood that other and perhaps simpler modes of operation may also exist. However, example embodiments of the present invention may each provide for entry of cooking parameters via a series of entry pages having an updatable selection indication ribbon as described herein. In this regard, FIGS. 6-20 illustrate various views of cooking parameter entry pages that may be presented in order to enable an operator to select various cooking parameters via respective different pages. The cooking parameter entry pages may each enable the operator to enter information related to cooking parameters that will be used to cook food product placed in the oven 10 and they may be accessed sequentially while building a selection indicator ribbon. However, after a selection indicator ribbon has been built (or even when partially built), any one of the graphical elements defining selections previously made that are displayed in the selection indicator ribbon may be selected to immediately jump or link back to the corresponding cooking parameter entry page on which the cooking parameter that corresponds to the selected graphical element was provided.

Figure 6:
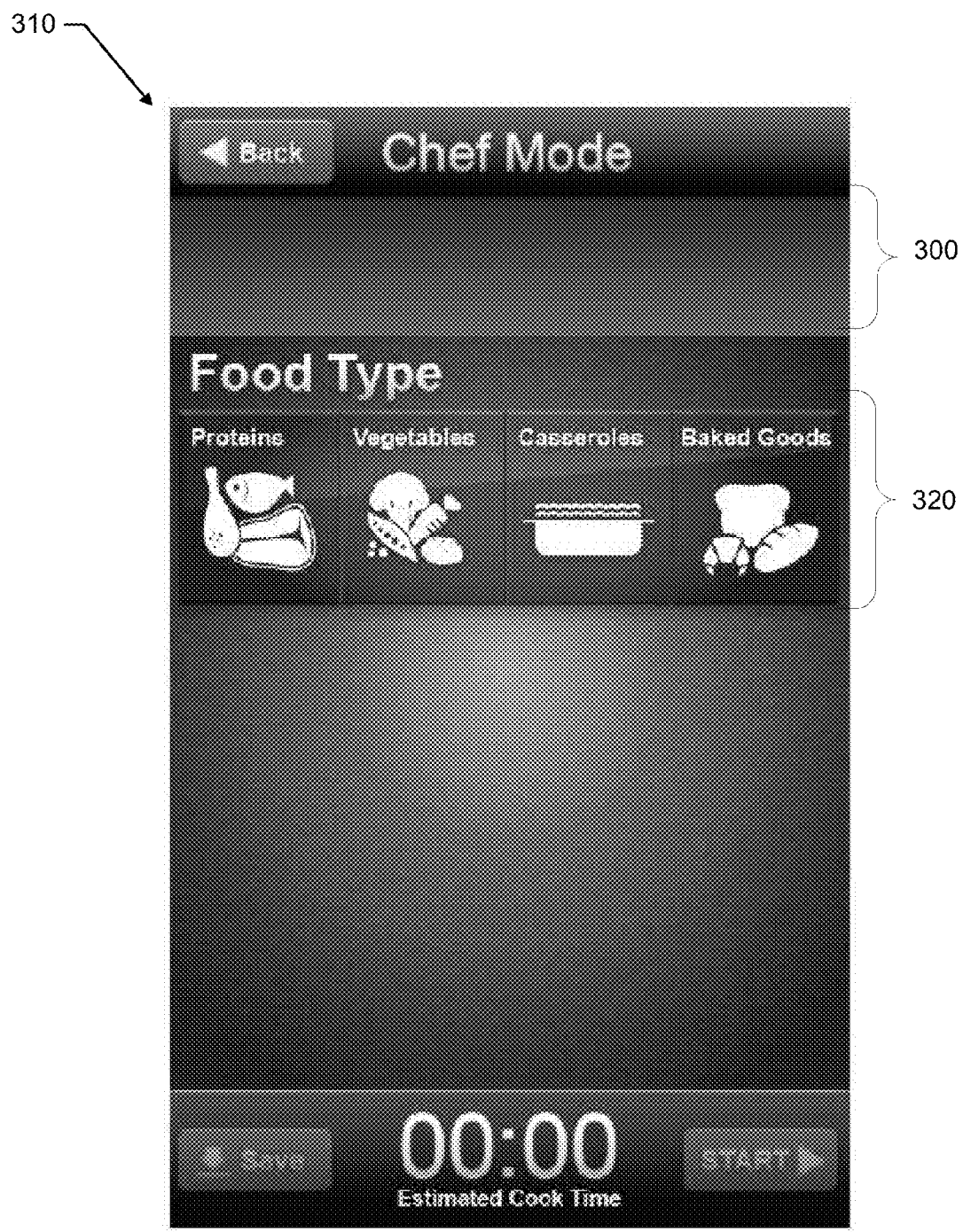
FIG. 6 illustrates an example screen for entry of cooking parameters according to an example embodiment.

FIG. 6 illustrates an example screen for entry of cooking parameters. In some embodiments, entry of cooking parameters may be provided via a plurality of individual entry screens, where each entry screen includes options for entry of one category of cooking parameter. Since there may be multiple cooking parameters entered prior to initiating a cooking operation, there may be corresponding multiple cooking parameter category-based entry pages. According example embodiments, each entry page may include a selection indicator ribbon 300 that shows selected options from all prior cooking parameter category-based entry pages. Given that the example of FIG. 6 is the first entry page, the selection indicator ribbon 300 does not yet include any selected options.

FIG. 6 illustrates an entry page 310 for entry of a selection of one food category or type option among a plurality of food categories or types with which the oven may operate. In this regard, a series of food category option tiles 320 (or icons) are provided as selectable graphical elements. The user may be enabled to select any one of the option tiles to designate the corresponding food category as a cooking parameter for use by the oven 10. By communicating the food category to the oven 10, the oven 10 may utilize the information for energy source selection. For example, the oven 10 (e.g., via the cooking controller 40) may select RF energy cooking parameters and/or combinations of other energy sources that may be appropriate to the corresponding food category selected. Thus, each food category option tile 320 may have corresponding data tables, recipes, or programs associated therewith and the selection of a specific option tile may enable the operator to be provided with programs that correspond to a relevant subset of the total population of tables, recipes or programs that are usable with the oven 10.

In some embodiments, the entry page 310 may indicate the current mode and may also provide navigation options such as a back button. The entry page 310 may generally also include save options and start options, but in some cases the save and/or start options may not be selectable until all cooking parameters have been entered. An estimated cook time may also be presented, but values may not be generated until all cooking parameters have been entered.

Figure 7:
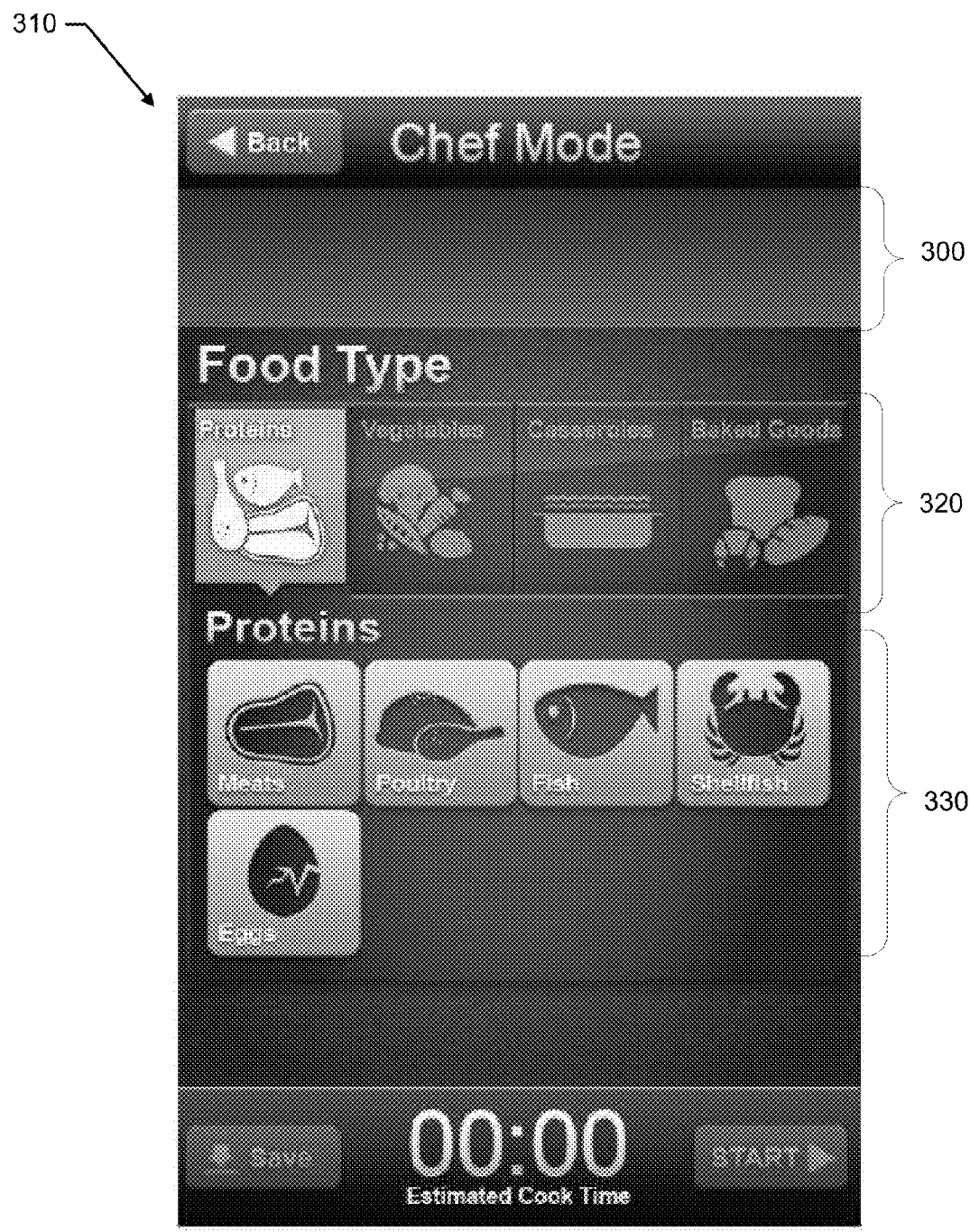
FIG. 7 illustrates an example in which subcategories within a protein main category group are provided to define finer categories of food categories that share cooking implementation guidelines and corresponding similar programming according to an example embodiment.

As shown in FIG. 6, one example embodiment may separate food category designations into main and sub-categories. In one example, the main categories may include proteins, vegetables, casseroles and baked goods. Each main category may have corresponding general cooking implementation guidelines associated therewith and therefore corresponding similar programming. However, within each main category, several subcategories may be further provided. For example, FIG. 7 illustrates an example in which subcategories within a protein main category group may also be provided to define finer categories of food types that share cooking implementation guidelines and corresponding similar programming. In this regard, for example, selection of a food category option tile 320 may generate a corresponding set of subcategory option tiles 330. The subcategory option tiles 330 for the protein main category group may include meats, poultry, fish, shellfish and eggs. Different cooking strategies may be employed within each respective subcategory.

Figure 8:
FIG. 8 illustrates an example provision of options for selection of an initial condition that is specific to a subcategory based on the presentation of initial condition tiles that are provided based on a selected subcategory option tile according to an example embodiment.

For some subcategories, further cooking parameter information may be required that may be specific to the corresponding subcategory (or a set of subcategories). For example, if meat is selected, the initial state of the meat may need to be known. Initial state may be chilled (e.g., out of the refrigerator) or frozen (e.g., out of the freezer) in some cases and the initial state may provide information to the cooking controller 40 to determine how long (and perhaps also a method for use) to cook the food product. Meat (and perhaps some other subcategories) may be cooked differently dependent upon its initial state relative to being chilled or frozen. However, another subcategory (e.g., eggs) may not have initial states of chilled or frozen, but may instead have initial conditions that identify whether the egg is in its shell or removed therefrom. Thus, the initial conditions may be presented based on the subcategory selected. FIG. 8 illustrates an example provision of options for selection of an initial condition that is specific to the meat subcategory based on the presentation of initial condition tiles 340 that are provided based on the selected one of the subcategory option tiles 330.

Figure 9:
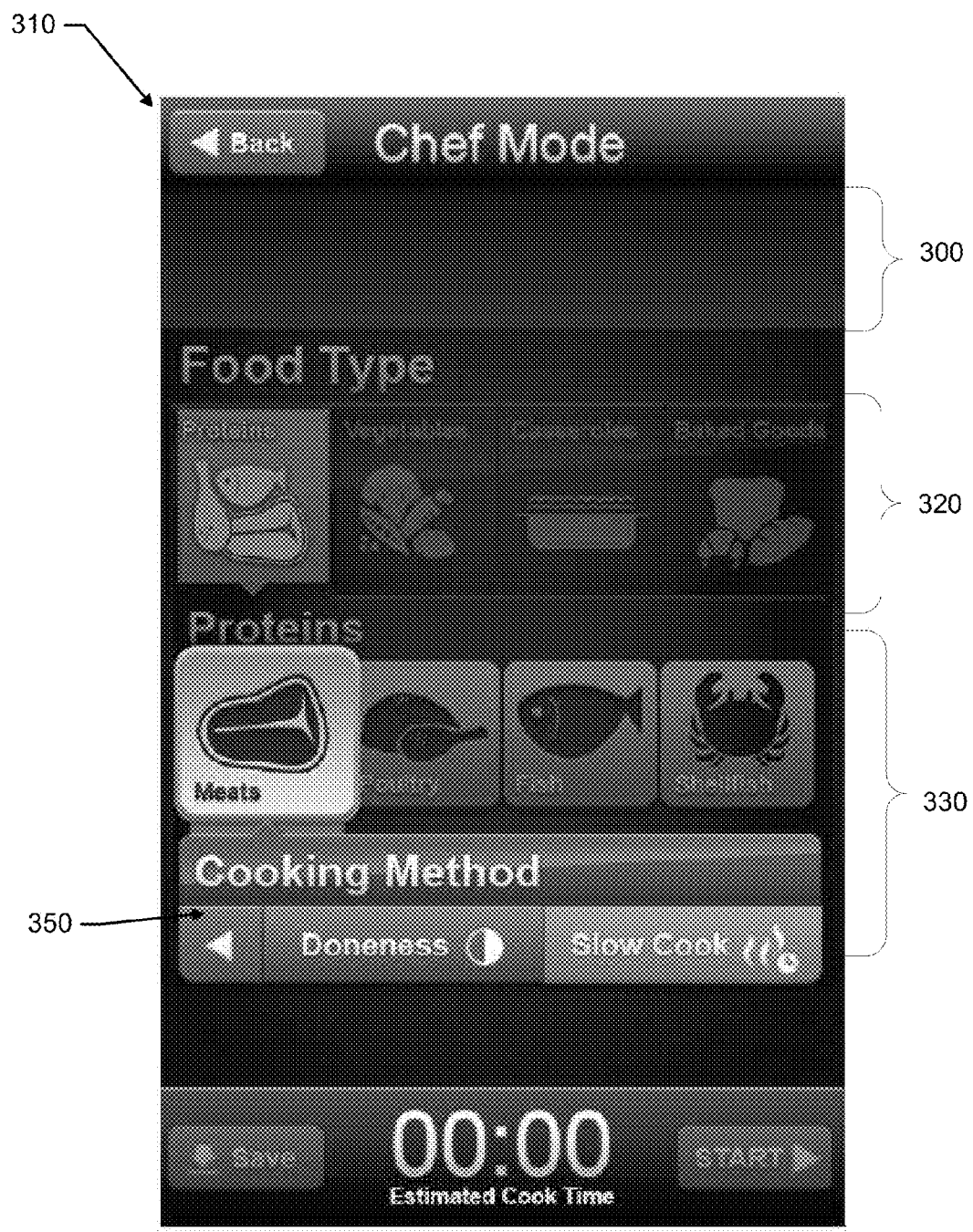
FIG. 9 illustrates an example in which available cooking method option tiles are presented for the subcategory selected according to an example embodiment.
Figure 10:
FIG. 10 illustrates an example in which the entry page is modified to include a entry option for doneness level according to an example embodiment.

Some subcategories may also have specific cooking method options that are associated therewith. FIG. 9 illustrates an example in which available cooking method option tiles 350 for the subcategory selected are presented. Meat may be cooked via a slow cook method or via cooking to a desired doneness level. If the slow cook method is selected, a temperature can be selected for provision over a selected time. However, if cooking to a desired doneness level is selected, a doneness scale 360 may be provided as shown in FIG. 10, and the operator may select (e.g., via positioning a slider bar over a scale) the desired doneness level.

Figure 11:
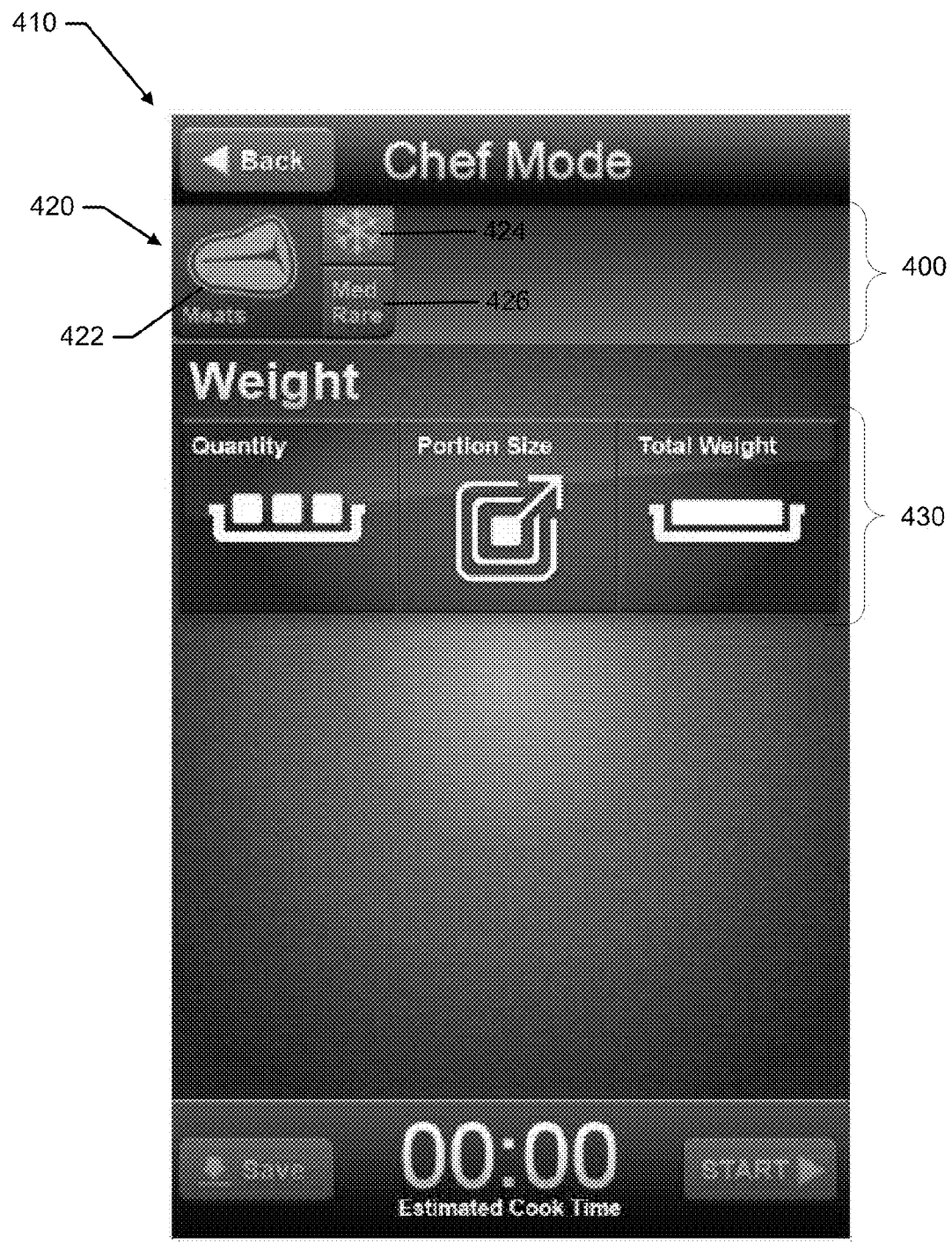
FIG. 11 illustrates an example screen shot of an entry page for entering cooking parameters relating to weight or mass of the food product according to an example embodiment.

Since all of the selection options shown in FIGS. 6-10 correspond to entry of information specific to food category, each entry may be provided an the same page (e.g., entry page 310). However, the entry page 310 may continually be provided with additional popup windows, control console sections or options as selection are made that have further suboptions associated therewith. When a final available suboption selection is made for the food category option entry page 310, a next entry page 410 may be provided as shown in FIG. 11. In this example, the entry page 410 may correspond to a weight selection page. As can be seen in FIG. 11, each time a new entry page is provided for selection of additional cooking parameters, the selection indicator ribbon may be updated to show all prior entries associated with previous cooking parameter entry pages. Thus, for example, updated selection indicator ribbon 400 is provided showing the food category selections made on the prior entry page (e.g., entry page 310).

In an example embodiment, the updated selection indicator ribbon 400 may indicate a food category option tile (or icon) 420. The food category option tile 420 shows the food category 422 (e.g., to the subcategory level) and any initial conditions 424 and cooking method specifications 426 that are applicable for that corresponding food category. This provides a record for the operator of the selections made on prior entry pages. Furthermore, the tiles provided in the updated selection indicator ribbon 400 may be selectable to enable the operator to link directly to the corresponding entry page (e.g., entry page 310) at a position on the work flow sequence that corresponds directly to entry of the selected option tile (or portion thereof). Thus, for example, if the operator selects the icon corresponding to the food category 422, the operator may be returned to the entry page 310 portion shown in FIG. 7 to change the selection of the subcategory. Meanwhile, if the operator selects the icon corresponding to the initial conditions 424, the operator can immediately return to the screen view shown in FIG. 8. If the operator selects the icon corresponding to the cooking method specifications 426 (e.g., doneness level) the operator may be returned to the view shown in FIG. 10 where a different doneness level can be selected. From that page, if the operator wishes to change the cooking method specification entirely (e.g., switch to slow cook methods), the operator may hit the back button and go to the view shown in FIG. 9. Thus, the main icon for the food option tile 420 may have sub-icons associated therewith to define additional corresponding selections that may be made on the same entry page (e.g., entry page 310)

Figure 12:
FIG. 12 illustrates an example screen shot of the entry page for entering a number of items to be cooked according to an example embodiment.
Figure 13:
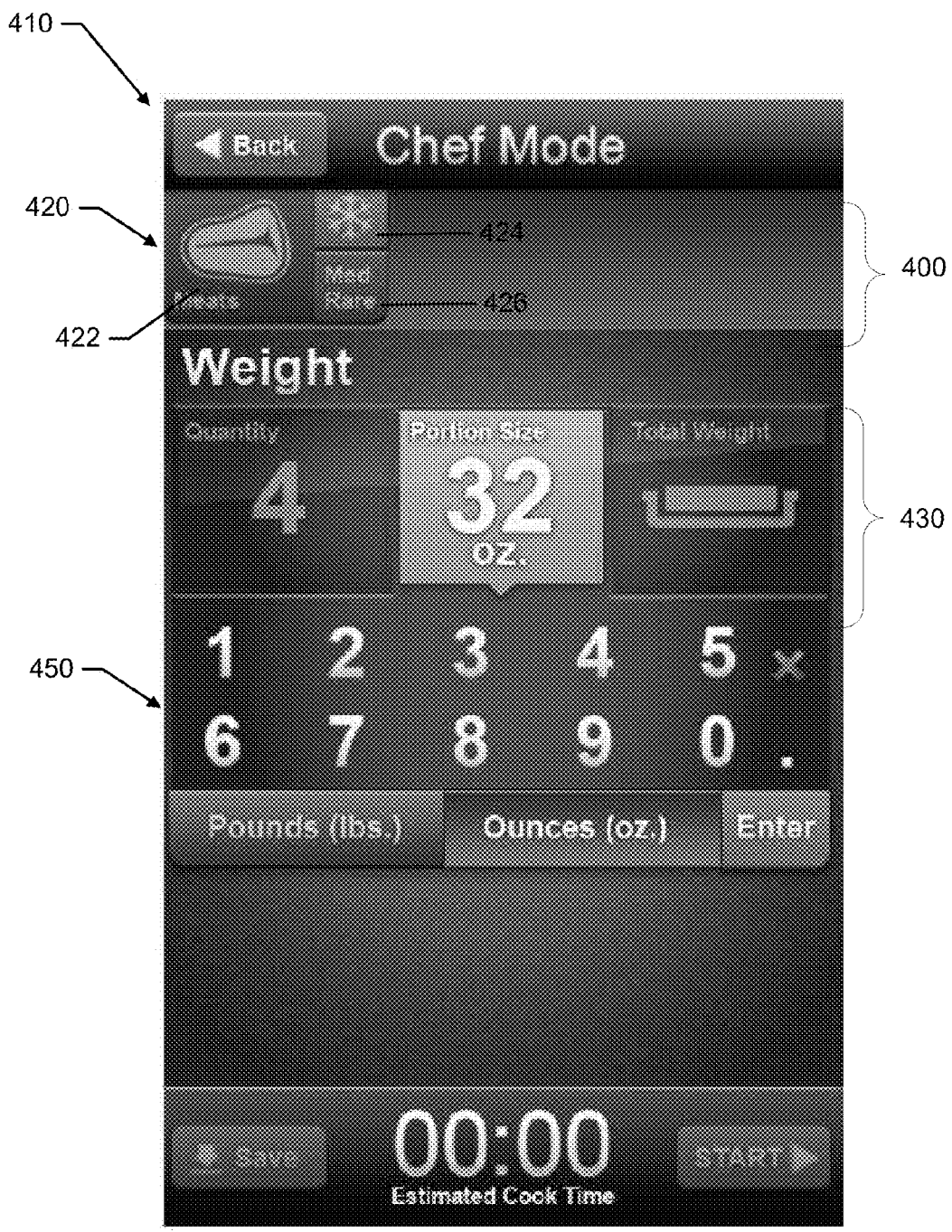
FIG. 13 illustrates an example screen shot of the entry page for entering an individual mass or weight for each item to be cooked according to an example embodiment.

Returning to FIG. 11, if no changes are desired by selection of the food category option tile 420, the weight option tile 430 may be presented to enable the operator to select a weight entry option. In some embodiments, weight entry may be made based on quantity and portion size or total weight. Corresponding icons may therefore be provided in the weight option tile 430 and operator selection of an icon will then generate a corresponding entry tab 440 to enable the operator to enter the weight accordingly. In the example of FIG. 12, quantity has been selected and thus, entry tab 440 allows the operator to enter a number or series of numbers to define the quantity of items to be cooked. Selection of portion size, enables the operator to select (in pounds, ounces, or metric weight values) a weight for each portion via portion size entry tab 450 as shown in FIG. 13. The total weight may then be apparent based on the number of items and weight of each item. However, total weight could be directly entered in some embodiments.

Figure 14:
FIG. 14 illustrates an example screen shot of an entry page for entering cooking parameters relating to location of the food product according to an example embodiment.

After entry of weight, another updated selection indicator ribbon 500 may be presented as shown in FIG. 14. Additionally, further cooking parameter information may also be entered. In this regard, for example, location information may be provided via entry page 510. As shown in FIG. 14, the food category option tile 420 may be presented as described above along with a weight information tile 520 that shows either the total weight or the number of items and weight of each item. In some embodiments, location information may also be presented as indicated by position information tiles 530. The location information may be indicative of or related to positioning relative to multiple potential trays in the oven 10. In this example, the oven 10 has two racks or trays that are supportable. Thus, the user may employ a corresponding one of the position information tiles 530 to inform the cooking controller 40 as to which tray or trays hold the food product described in the updated selection indicator ribbon 500.

Figure 15:
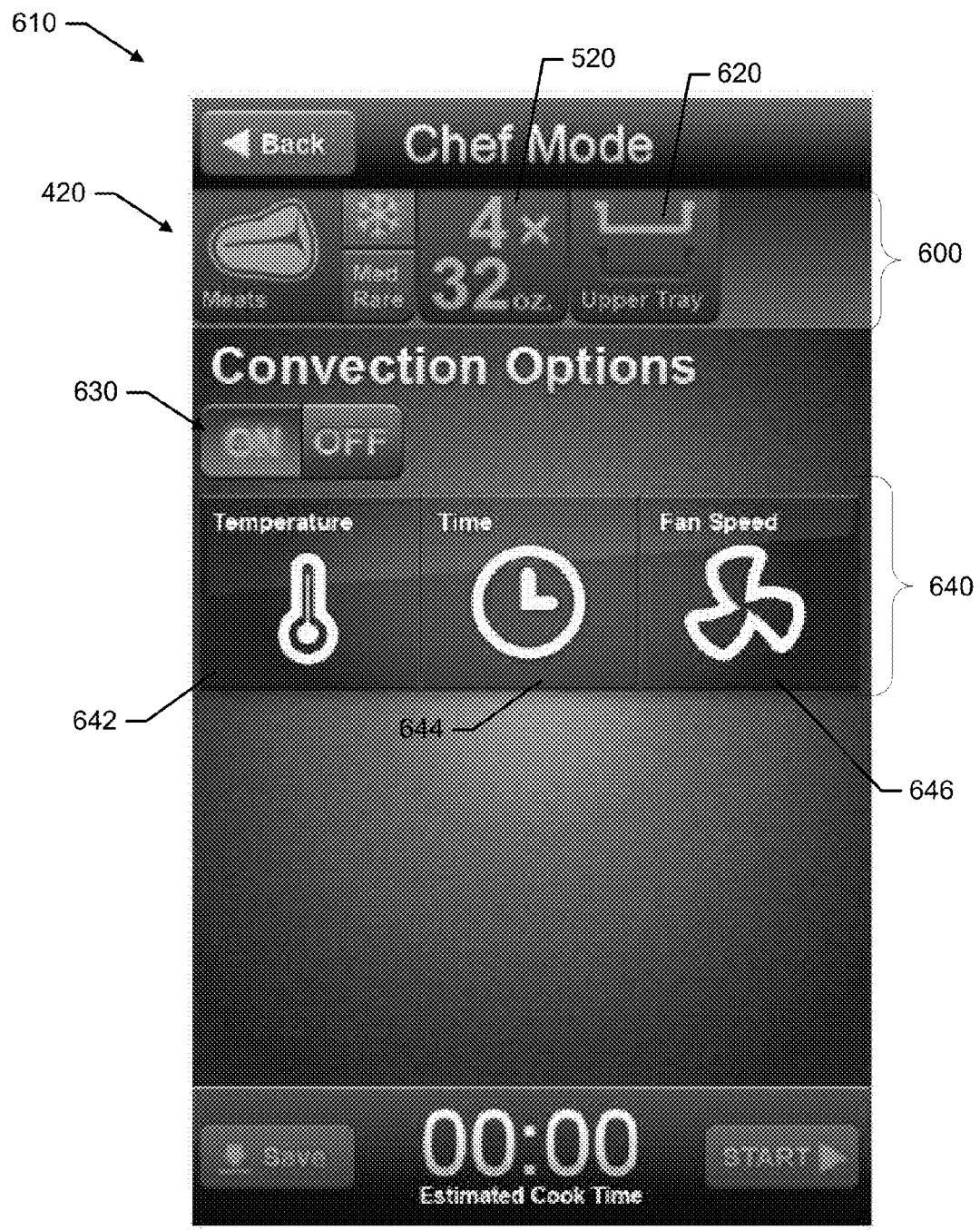
FIG. 15 illustrates an example entry page for controlling convection heat options and showing an updated selection indicator ribbon according to an example embodiment.

In an example embodiment, the cooking controller 40 may utilize the information provided that is descriptive of food category (including initial conditions and cooking method specifications that are specific to a corresponding food category), weight or mass, and location and determine cooking instructions utilizing the first energy source 20 (e.g., RF cooking instructions) based on the information provided. However, in some cases, use of the second energy source 30 (e.g., for browning or other characteristics) may be desired as well. Thus, in some embodiments, the operator may be further provided with options for controlling additional energy sources. FIG. 15 illustrates an example entry page 610 for controlling convection heat options according to an example embodiment. In this regard, for example, FIG. 15 illustrates an updated selection indicator ribbon 600 showing all selections made thus far including the food category option tile 420, the weight information tile 520 and a selected location tile 620. As indicated above, the corresponding screens associated with the icons or tiles shown may be directly accessed or linked to by selection of any one of the tiles displayed in the updated selection indicator ribbon 600.

Figure 16:
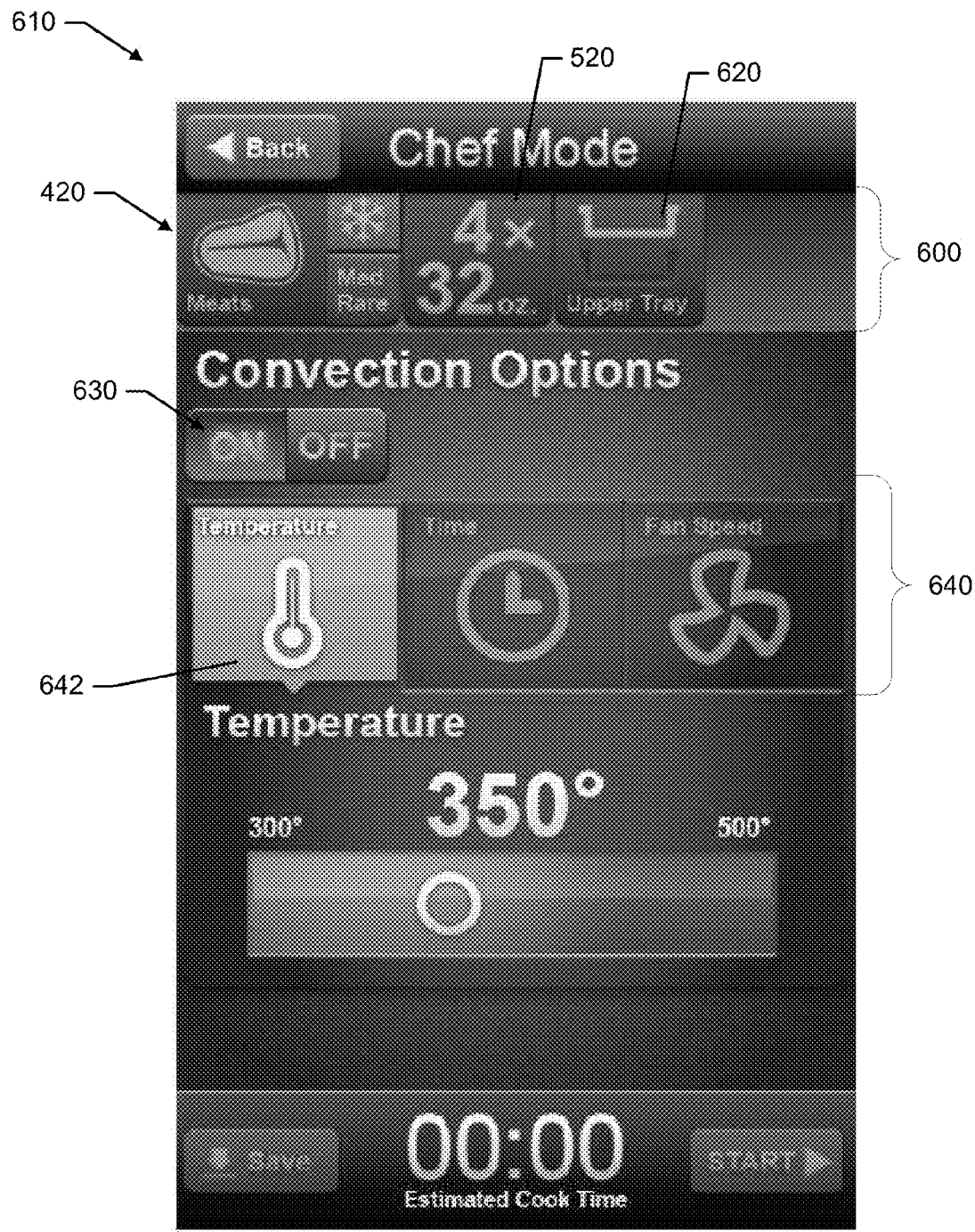
FIG. 16 illustrates the entry page of FIG. 15 in response to selection of a temperature icon to enable operator entry of a specific temperature according to an example embodiment.
Figure 17:
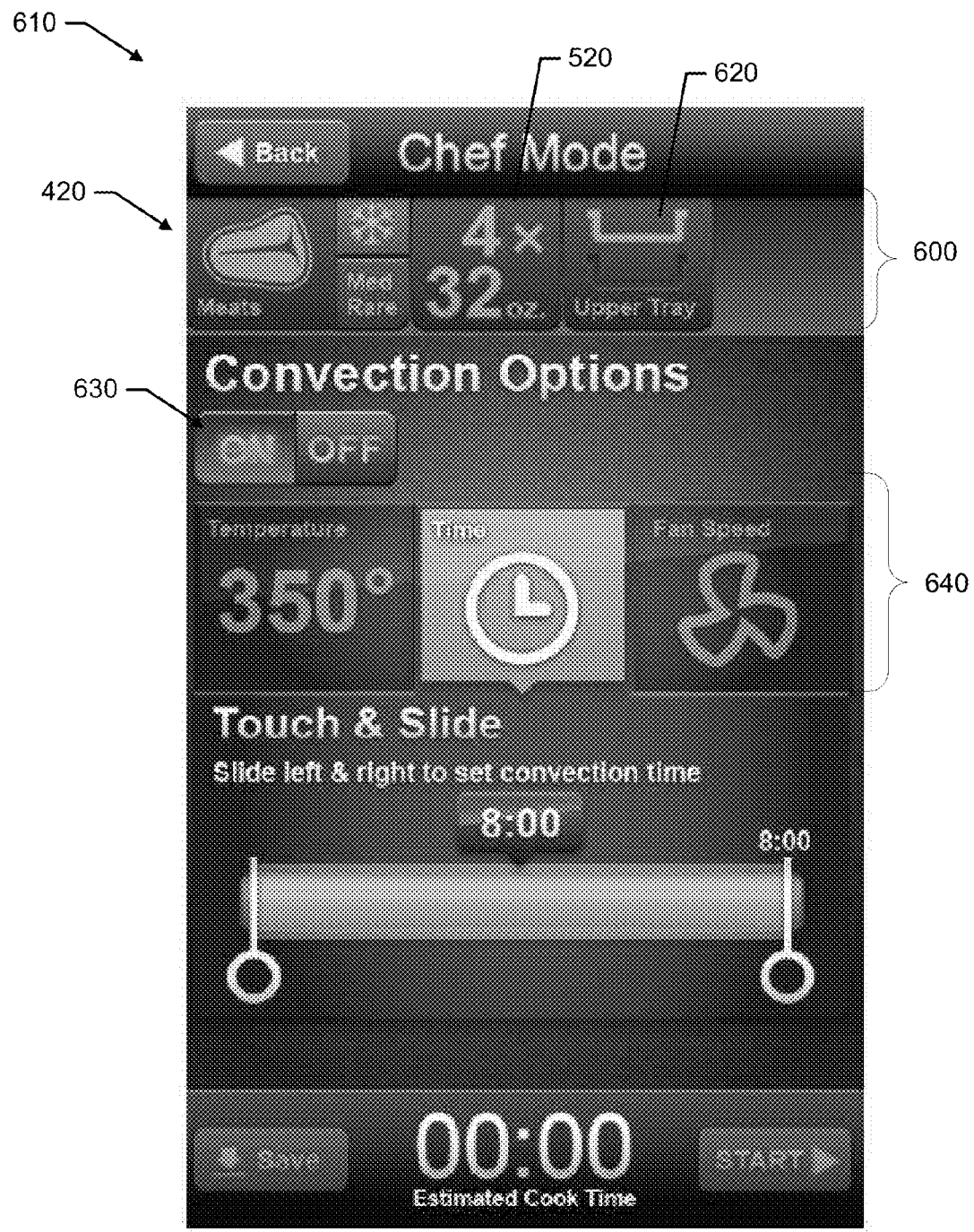
FIG. 17 illustrates the entry page of FIG. 16 in response to selection of a time icon to enable operator entry of a specific time according to an example embodiment.
Figure 18:
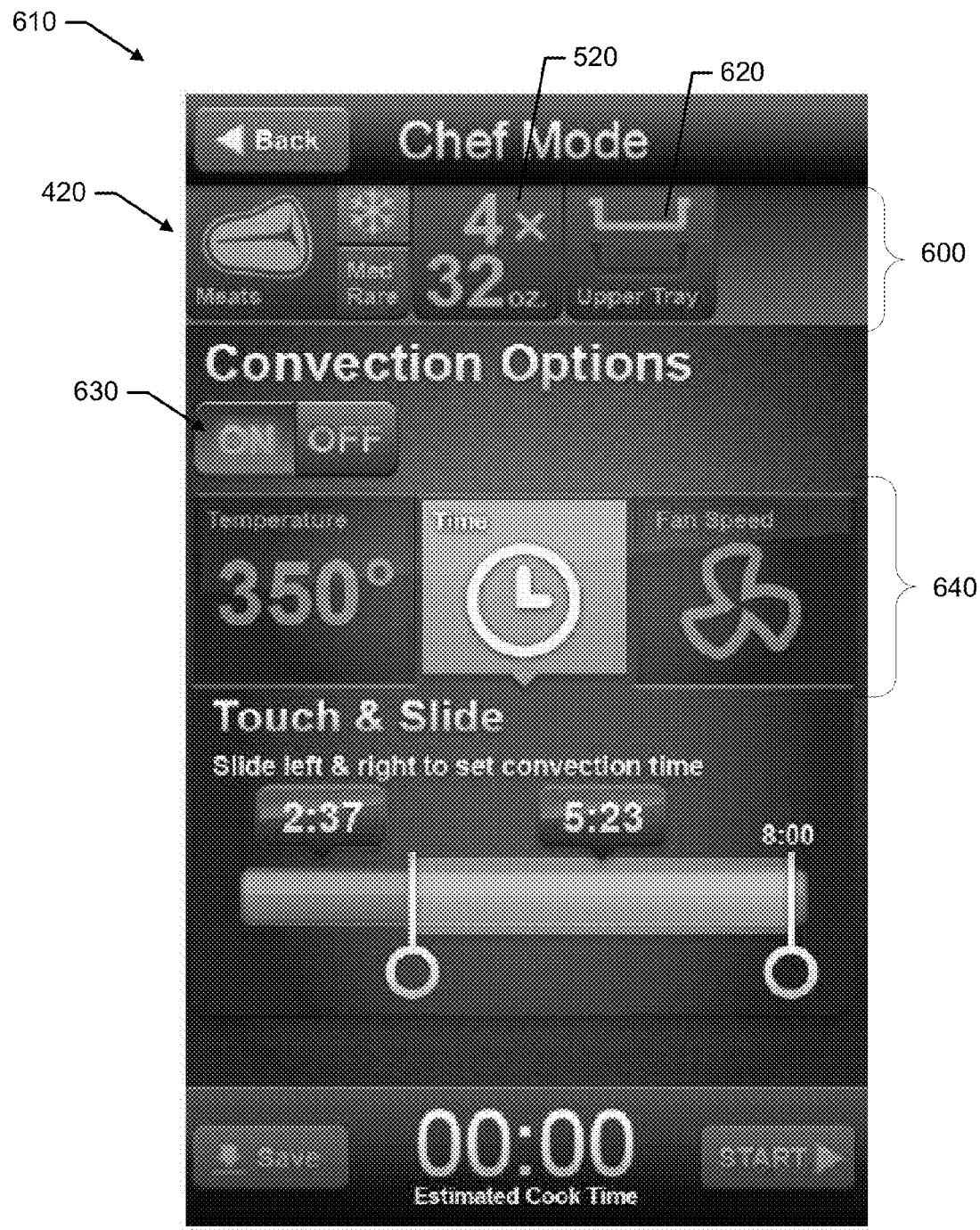
FIG. 18 illustrates the entry page of FIG. 16 in response to selection of a time icon to enable operator entry of a specific time range according to an example embodiment.
Figure 19:
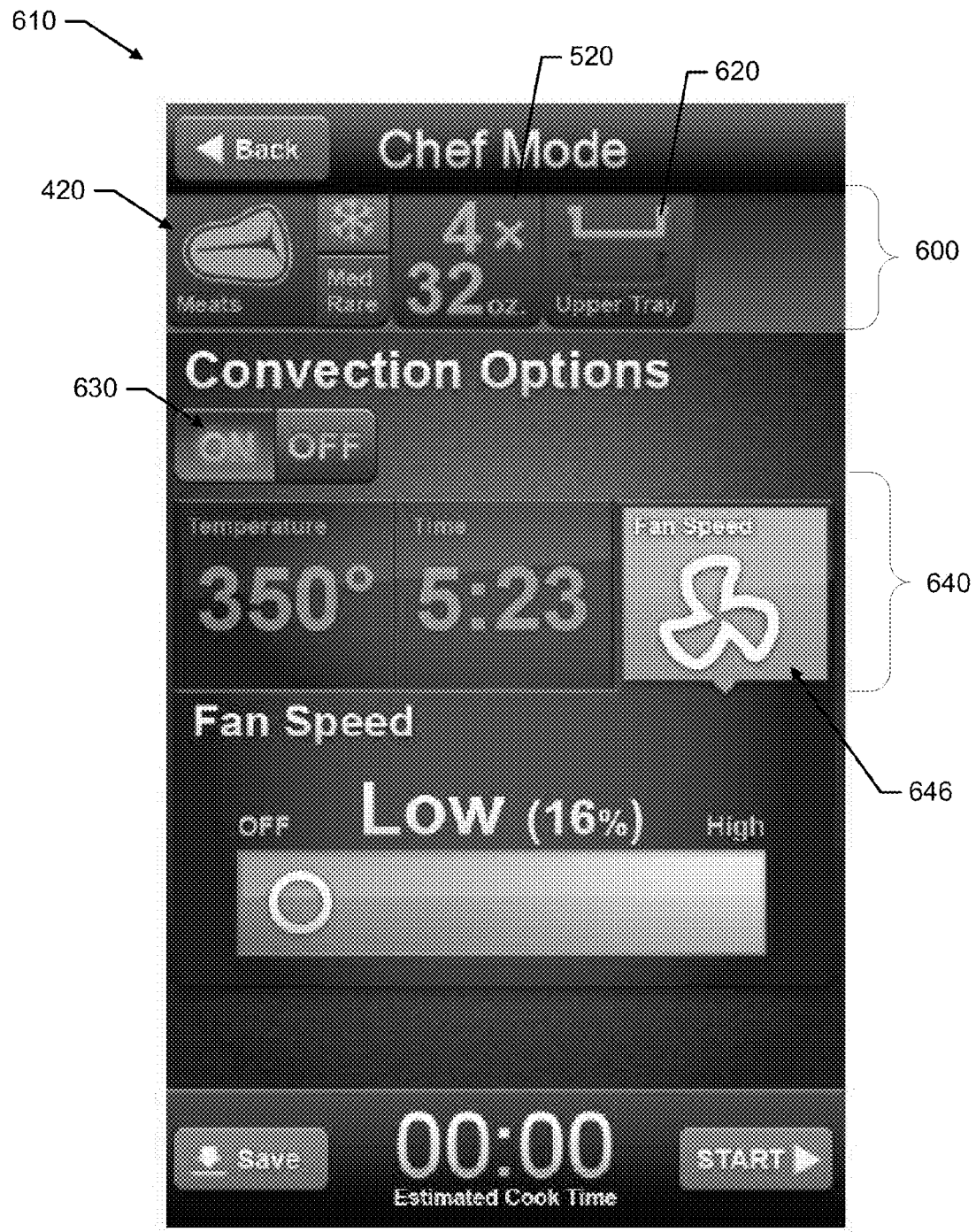
FIG. 19 illustrates the entry page of FIG. 16 or 17 in response to selection of a fan speed icon to enable operator entry of a specific fan speed according to an example embodiment.
Figure 20:
FIG. 20 illustrates a screen shot of a page displayed when cooking operations have begun to indicate a final selection indicator ribbon along with a total estimated cook time according to an example embodiment.

As shown in FIG. 15, the second energy source 30 (e.g., convection heating) may be toggled on or off using a main control selector 630. If the second energy source 30 is enabled by toggling it on, then application options tile 640 may be presented. The application options tile 640 may provide specific control options such as temperature, time and/or fan speed. If temperature is selected, the operator may be provided with a range of temperatures and slider bar control to select a desired temperature as shown in FIG. 16. If time is selected, the operator may be provided with a time scale and again slider bar control may be used to enter the desired time for application of the selected temperature. The application options tile 640 may be updated also to show the selected temperature as indicated in FIG. 17 in response to selection of the temperature tile 642. In some embodiments, a specific time range over which convection heat is to be applied may be selected as shown in FIG. 18 responsive to selection of the time tile 644. If fan speed is selected, the operator may be provided with a fan speed scale and again slider bar control may be used to enter the desired fan speed as shown in FIG. 19 responsive to selection of the fan speed tile 646. In each instance where an entry is made, the application options tile 640 may be updated to show prior entries and any one of those entries may be linked to or otherwise directly accessed be selection thereof. After all entries have been made (or at least sufficient entries to define a complete program for cooking), the save and start options may be enabled and the operator may either save the program defined or start the program. After the cooking program is started, an updated and final selection indicator ribbon 700 may be presented along with an indicator of the total estimated cook time 710 as shown in FIG. 20. The selection indicator ribbon 700 may include each of the previously discussed tiles and the second energy source information tile 720. Options may also be presented to pause or end the program or view the corresponding recipe. As indicated above, selection of any of the icons in the selection indicator ribbon 700 may take the operator directly to the corresponding screens or entry pages selected and changes may be made. Thus, the program may be altered so that the user does not have to completely recreate a program, but can instead make modifications to an existing program.

Of note, FIG. 20 shows the selection indication ribbon 700 updated to show all selections for the current program or recipe. Moreover, the selection indication ribbon 700 is completely full from left to right, exactly filling the space available on the screen displayed. In some embodiments, the icons, tiles or other graphical elements may be sized such that a full complement of selections defining a program or recipe may fill the space available without extending off of a currently displayed page. In other words, for example, icon size may be adjusted as needed to fill the space available regardless of the number of selections. However, as an alternative, the icons, tiles or graphical elements may have substantially fixed sizes and when a sufficient number of such elements have been selected to extend beyond the borders of the currently displayed screen, all or a portion of some graphical elements may not be displayed since they do not fit on the currently displayed screen. In such examples, an indication may be provided to the operator to show that one or more of the graphical elements (or portions thereof) do not fit on the screen. The indication may enable the operator to access such graphical elements extending off of the right and/or left side of a displayed screen. For example, scroll indicators may be presented to enable the operator to access graphical elements that are a part of the selection indication ribbon 700 but are not currently displayed since they are at a portion of the selection indication ribbon 700 that extends off of the page. By selecting a scroll indicator, the operator may be enabled to scroll over the selection indication ribbon 700 to expose graphical elements that were previously not displayed due to falling outside of the currently displayed page. In some cases, the scroll indicator may merely indicate the existence of items off edges of the screen, but the selection indication ribbon 700 may be scrolled by touch and drag or click and drag operations rather than by selection of the scroll indicator.

Figure 21:
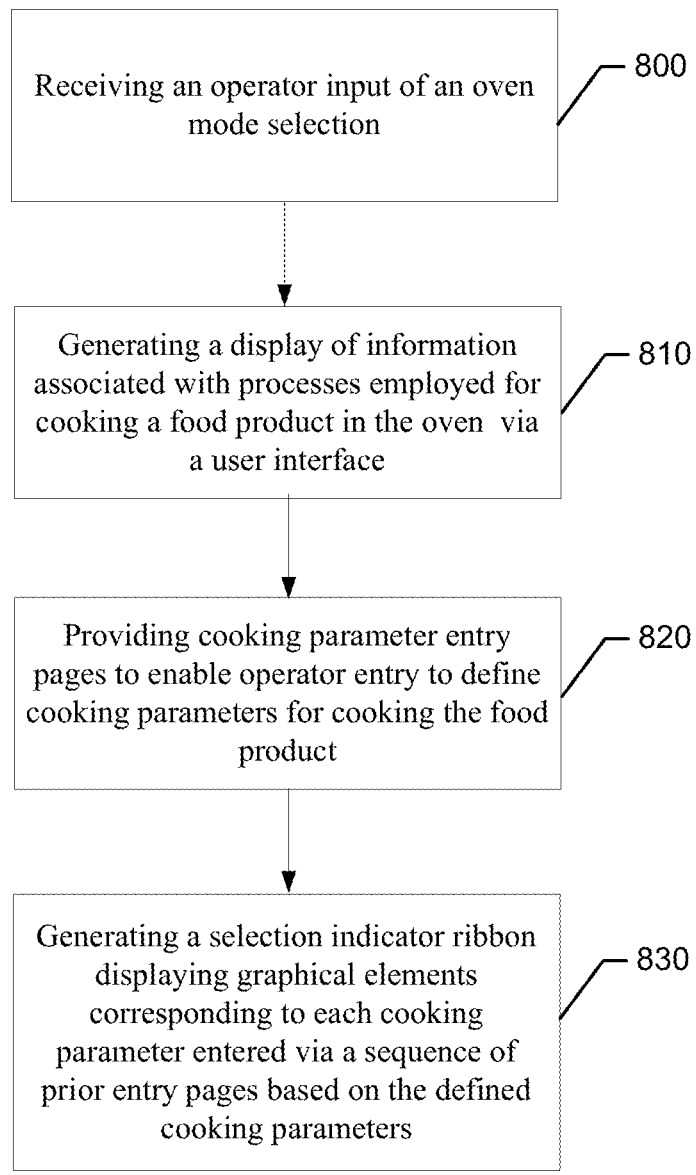
FIG. 21 illustrates a block diagram of a flow chart showing a method according to an example embodiment.

FIG. 21 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user terminal (e.g., oven 10) and executed by a processor in the user terminal. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 21, may include receiving an operator input of an oven mode selection at optional operation 800. A user interface may be utilized to generate (e.g., based on the mode selection in embodiments where a mode selection is made) a display of information associated with processes employed for cooking a food product in the oven at operation 810. Thereafter, cooking parameter entry pages may be provided to enable operator entry to define cooking parameters for cooking the food product at operation 820. Operator inputs defining the cooking parameters may then be used to generate a selection indicator ribbon displaying graphical elements corresponding to each cooking parameter entered via a sequence of prior entry pages at operation 830.

In an example embodiment, an apparatus for performing the method of FIG. 21 above may comprise a processor (e.g., the processor 110) configured to perform some or each of the operations (800-830) described above. The processor may, for example, be configured to perform the operations (800-830) by performing hardware implemented logical functions, executing stored instructions, or executing algorithms for performing each of the operations.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all That which is claimed:

1. An oven comprising:
a cooking chamber configured to receive a food product;
a user interface configured to display information associated with processes employed for cooking the food product; and
a cooking controller operably coupled to the user interface to direct presentation of cooking parameter entry pages to enable an operator to define cooking parameters for cooking the food product in the cooking chamber, the cooking controller including processing circuitry configured to enable an operator to make cooking parameter entries in a series of entry pages rendered at the user interface,
wherein each of the entry pages presented includes a selection indicator ribbon displaying graphical elements corresponding to each cooking parameter entered via previous entry pages.

2. The oven of claim 1, wherein the cooking controller is configured to, responsive to selection of any one of the graphical elements displayed in the selection indicator ribbon, display an entry page for entry of cooking parameter data corresponding to the one of the graphical elements selected.

3. The oven of claim 1, wherein the cooking controller is configured to display cooking parameters including at least one of food product category, food product weight or food product location.

4. The oven of claim 3, wherein the cooking controller is configured to enable entry of food product weight as a total weight or as a per item weight along with an indication of a total number of items.

5. The oven of claim 3, wherein the cooking controller is configured to display cooking parameters including at least food product category, food product weight and food product location.

6. The oven of claim 3, wherein the cooking controller is configured to enable entry of food product category based on a series of food product categories in which at least one food product category has a corresponding set of sub-groups, each sub-group having respective different cooking characteristics associated therewith.

7. The oven of claim 6, wherein the cooking controller is configured to enable entry of initial conditions specific to the corresponding sub-group.

8. The oven of claim 6, wherein the cooking controller is configured to enable entry of cooking method selections specific to the corresponding sub-group.

9. The oven of claim 1, wherein the cooking parameter entries include information usable to determine cooking instructions using a first energy source corresponding to application of radio frequency energy and cooking instructions relating to a second energy source associated with defining an air temperature, time and fan speed.

10. The oven of claim 1, wherein the cooking controller is configured to display an icon associated with each entry page, and wherein at least one icon includes sub-icons that correspond to respective different sub-selections made on a single entry page.

11. The oven of claim 1, wherein the cooking parameter entries are entered via a touch screen display.

12. A cooking controller for use in an oven including a cooking chamber and a user interface configured to display information associated with processes employed for cooking the food product in the cooking chamber, the cooking controller being operably coupled to the user interface to direct presentation of cooking parameter entry pages to enable an operator to define cooking parameters for cooking the food product, the cooking controller comprising:
processing circuitry configured to enable an operator to make cooking parameter entries in a series of entry pages rendered at the user interface, wherein each of the entry pages presented is generated by the processing circuitry to include a selection indicator ribbon displaying graphical elements corresponding to each cooking parameter entered via previous entry pages.

13. The cooking controller of claim 12, wherein the cooking controller is configured to, responsive to selection of any one of the graphical elements displayed in the selection indicator ribbon, display an entry page for entry of cooking parameter data corresponding to the one of the graphical elements selected.

14. The cooking controller of claim 12, wherein the cooking controller is configured to display cooking parameters including at least food product category, food product weight and food product location.

15. The cooking controller of claim 14, wherein the cooking controller is configured to enable entry of food product weight as a total weight or as a per item weight along with an indication of a total number of items.

16. The cooking controller of claim 14, wherein the cooking controller is configured to display cooking parameters including at least food product category, food product weight and food product location.

17. The cooking controller of claim 14, wherein the cooking controller is configured to enable entry of food product category based on a series of food product categories in which at least one food product category has a corresponding set of sub-groups, each sub-group having respective different cooking characteristics associated therewith.

18. The cooking controller of claim 17, wherein the cooking controller is configured to enable entry of initial conditions specific to the corresponding sub-group.

19. The cooking controller of claim 17, wherein the cooking controller is configured to enable entry of cooking method selections specific to the corresponding sub-group.

20. The cooking controller of claim 12, wherein the cooking parameter entries include information usable to determine cooking instructions using a first energy source corresponding to application of radio frequency energy and cooking instructions relating to a second energy source associated with defining an air temperature, time and fan speed.

* * * * *